US010558203B2

(12) United States Patent
Miyake et al.

(10) Patent No.: US 10,558,203 B2
(45) Date of Patent: Feb. 11, 2020

(54) CONSUMER'S FACILITY EQUIPMENT, CONTROL APPARATUS, AND CONTROL METHOD

(71) Applicant: KYOCERA Corporation, Kyoto (JP)

(72) Inventors: Takashi Miyake, Sagamihara (JP); Takeshi Yamane, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 73 days.

(21) Appl. No.: 14/779,324

(22) PCT Filed: Mar. 19, 2014

(86) PCT No.: PCT/JP2014/057602
§ 371 (c)(1),
(2) Date: Sep. 22, 2015

(87) PCT Pub. No.: WO2014/148575
PCT Pub. Date: Sep. 25, 2014

(65) Prior Publication Data
US 2016/0054732 A1 Feb. 25, 2016

(30) Foreign Application Priority Data
Mar. 22, 2013 (JP) ................ 2013-059502

(51) Int. Cl.
H04L 29/00 (2006.01)
G05B 19/418 (2006.01)
(Continued)

(52) U.S. Cl.
CPC ....... *G05B 19/41855* (2013.01); *G06F 21/44* (2013.01); *H02J 13/0006* (2013.01);
(Continued)

(58) Field of Classification Search
CPC ............. H04L 12/2803; H04L 12/2818; H04L 63/126; H04L 63/20
See application file for complete search history.

(56) References Cited

U.S. PATENT DOCUMENTS

2001/0039590 A1* 11/2001 Furukawa ......... H04L 29/12009
709/238
2002/0069276 A1* 6/2002 Hino ................... H04L 12/2803
709/223

(Continued)

FOREIGN PATENT DOCUMENTS

JP 2003-122650 A 4/2003
JP 2004-254163 A 9/2004
(Continued)

OTHER PUBLICATIONS

International Search Report dated Jun. 17, 2014, issued for International Application No. PCT/JP2014/057602.
(Continued)

*Primary Examiner* — Fatoumata Traore
(74) *Attorney, Agent, or Firm* — Procopio Cory Hargreaves and Savitch LLP

(57) ABSTRACT

Equipment (300) is controlled and/or managed by EMS (200) by exchanging, with the EMS (200), a message configured to comply with a predetermined communication protocol through a network. The equipment (300) comprises a controller (330) that determines to execute a process requested by a request message requesting execution of the process on the equipment (300) when the request message is received from the EMS (200) and the request message includes predetermined authentication information.

10 Claims, 8 Drawing Sheets

(51) Int. Cl.
*G06F 21/44* (2013.01)
*H02J 13/00* (2006.01)
*H04L 29/06* (2006.01)
*H04L 12/28* (2006.01)

(52) U.S. Cl.
CPC ............ *H04L 63/08* (2013.01); *H04L 63/105* (2013.01); *G05B 2219/31115* (2013.01); *H04L 12/2818* (2013.01); *Y02B 70/325* (2013.01); *Y04S 20/228* (2013.01); *Y04S 40/24* (2013.01)

(56) References Cited

U.S. PATENT DOCUMENTS

| | | | | |
|---|---|---|---|---|
| 2003/0018753 | A1* | 1/2003 | Seki | H04L 12/2803 709/219 |
| 2003/0061380 | A1 | 3/2003 | Saito et al. | |
| 2003/0158956 | A1* | 8/2003 | Tanaka | H04L 12/66 709/230 |
| 2004/0268362 | A1* | 12/2004 | Chambliss | G06F 9/544 719/312 |
| 2005/0177869 | A1* | 8/2005 | Savage | G06F 21/41 726/11 |
| 2006/0068759 | A1 | 3/2006 | Ikebe et al. | |
| 2006/0178777 | A1* | 8/2006 | Park | B25J 9/0003 700/245 |
| 2007/0208938 | A1 | 9/2007 | Hosoda | |
| 2007/0255852 | A1* | 11/2007 | McBride | H04W 12/06 709/246 |
| 2008/0055640 | A1* | 3/2008 | Takahashi | G06F 9/4411 358/1.15 |
| 2009/0144804 | A1 | 6/2009 | Idicula et al. | |
| 2010/0005166 | A1* | 1/2010 | Chung | H04L 12/2803 709/224 |
| 2011/0210987 | A1* | 9/2011 | Furui | H04N 9/31 345/682 |
| 2012/0137126 | A1 | 5/2012 | Matsuoka et al. | |
| 2012/0151006 | A1* | 6/2012 | McInerney | H04L 12/2818 709/219 |
| 2013/0247152 | A1* | 9/2013 | Minami | G06F 21/30 726/4 |

FOREIGN PATENT DOCUMENTS

| | | |
|---|---|---|
| JP | 2007-226429 A | 9/2007 |
| JP | 2008-032655 A | 2/2008 |
| JP | 2008-129834 A | 6/2008 |
| JP | 2010-128810 A | 6/2010 |
| WO | 2007/115209 A2 | 10/2007 |

OTHER PUBLICATIONS

Office Action dated Nov. 15, 2016, issued by the Japanese Patent Office for the corresponding Japanese Patent Application No. 2016-169014.

Extended European Search Report dated Sep. 15, 2016 by the European Patent Office in counterpart European Patent Application No. 14 77 1030.

* cited by examiner

FIG. 8

| AUTHENTICATION LEVEL | TYPE OF REQUEST MESSAGE | | |
|---|---|---|---|
| | SPECIFICATION REFERENCE REQUEST MESSAGE | STATUS REFERENCE REQUEST MESSAGE | STATUS CONTROL REQUEST MESSAGE |
| HIGH | ○ | ○ | ○ |
| MEDIUM | ○ | ○ | △ POSSIBLE/NOT POSSIBLE (LOW SIGNIFICANCE INFORMATION ONLY: POSSIBLE) |
| LOW | △ POSSIBLE/NOT POSSIBLE (LOW SIGNIFICANCE INFORMATION ONLY: POSSIBLE) | △ POSSIBLE/NOT POSSIBLE (LOW SIGNIFICANCE INFORMATION ONLY: POSSIBLE) | × |

○: POSSIBLE TO PROCESS
△: PARTIALLY POSSIBLE TO PROCESS
×: NOT POSSIBLE TO PROCESS

CONSUMER'S FACILITY EQUIPMENT, CONTROL APPARATUS, AND CONTROL METHOD

TECHNICAL FIELD

The present invention relates to a consumer's facility equipment applied to a network provided in a power consumer's facility, a control apparatus therefor, and a control method therefor.

BACKGROUND ART

Recently, a control system, which comprises a control apparatus that controls and manages a consumer's facility equipment through a network provided in a power consumer's facility, is widely used (for example, Patent Literature 1). For example, a control apparatus used in a network provided in a residence, etc., is called HEMS (Home Energy Management System). Examples of the consumer's facility equipment include a load that consumes power to operate (for example, a home appliance) or a distributed power supply (for example, a solar cell apparatus, a storage battery apparatus, or a fuel cell apparatus) that outputs power.

In such a control system, when the consumer's facility equipment and the control apparatus exchange a message configured to comply with a predetermined communication protocol, the control apparatus controls and manages the consumer's facility equipment. In a control system applied to a network, a communication protocol such as ECHONET Lite (registered trademark) is used, for example.

CITATION LIST

Patent Literature

[Patent Literature 1] Japanese application publication No. 2010-128810.

SUMMARY OF INVENTION

For example, when the consumer's facility equipment that supports ECHONET Lite (registered trademark) receives, from a control apparatus, a message configured to comply with the ECHONET Lite (registered trademark), the equipment operates in accordance with a content of the received message. Specifically, the consumer's facility equipment executes a process for information designated by the received message. However, for example, even when a message configured to comply with the ECHONET Lite (registered trademark) is received from a control apparatus intended to fraudulently control the consumer's facility equipment, the consumer's facility equipment that supports the ECHONET Lite (registered trademark) may operate in accordance with a content of the received message.

Therefore, the present invention has been achieved to resolve the above-described problem and an object thereof is to provide a consumer's facility equipment, a control apparatus, and a control method that enable an enhancement of the security of ECHONET Lite (registered trademark) and the like.

A consumer's facility equipment according to a first aspect is controlled and/or managed by a control apparatus by exchanging, with the control apparatus, a message configured to comply with a predetermined communication protocol through a network provided in a power consumer's facility. The consumer's facility equipment comprises a controller that determines to execute a process requested by a request message requesting execution of the process on the consumer's facility equipment when the request message is received from the control apparatus and the request message includes predetermined authentication information.

In the first aspect, the request message is a message requesting execution of a process for one or more pieces of information designated from among plural pieces of information included in the consumer's facility equipment. The controller determines to execute the process for the designated information when the predetermined authentication information is included in the request message.

In the first aspect, the consumer's facility equipment further comprises a storage that stores authentication information used for authenticating the control apparatus. The controller determines to execute the process for the designated information when the predetermined authentication information included in the request message corresponds to the authentication information stored in the storage.

In the first aspect, the controller determines to not execute the process for the designated information when the request message does not include the predetermined authentication information.

In the first aspect, the storage stores plural pieces of authentication information to which authentication levels are set. When the request message includes the predetermined authentication information and the predetermined authentication information corresponds to any of the plural pieces of authentication information stored in the storage, the controller determines to execute a process for information selected from among the designated information in accordance with an authentication level corresponding to the predetermined authentication information.

In the first aspect, when the request message includes the predetermined authentication information and requests a readout and a write for the designated information, the controller determines to execute a readout of the designated information and determines to not execute a write into the designated information if the authentication level corresponding to the predetermined authentication information is lower than a predetermined authentication level.

In the first aspect, the controller executes different processes in accordance with whether or not the request message includes remote information indicating that the request message is a message by a remote control.

In the first aspect, the consumer's facility equipment further comprises an operation unit or an independent remote controller. When the request message includes the remote information, the controller determines to execute a process requested by the request message, in a range that is more restricted than a processing range that can be instructed by an operation of the operation unit or the remote controller.

In the first aspect, the consumer's facility equipment is a distributed power supply or a load that exchanges, with the control apparatus, a message configured to comply with ECHONET Lite (registered trademark) as the predetermined communication protocol.

A control apparatus according to a second aspect exchanges, with a consumer's facility equipment, a message configured to comply with a predetermined communication protocol through a network provided in the consumer's facility to control and/or manage the consumer's facility equipment. The control apparatus comprises: a controller that creates a request message requesting execution of a process on the consumer's facility equipment; and a storage that stores predetermined authentication information used for authenticating the control apparatus. The controller includes the predetermined authentication information into the request message.

A control method according to a third aspect is a method in a consumer's facility equipment that is controlled and/or managed by a control apparatus by exchanging a message configured to comply with a predetermined communication protocol through a network provided in a power consumer's facility. The control method comprises steps of: receiving, from the control apparatus, a request message requesting execution of a process on the consumer's facility equipment; determining whether or not predetermined authentication information is included in the request message; and determining to execute the process requested by the request message when the predetermined authentication information is included in the request message.

According to the present invention, it is possible to provide a consumer's facility equipment, a control apparatus, and a control method that enable an enhancement of the security of ECHONET Lite (registered trademark) and the like.

BRIEF DESCRIPTION OF DRAWINGS

FIG. 8 is a diagram illustrating a table to be stored in a storage of EMS according to a first modification.

DESCRIPTION OF EMBODIMENTS

Figure 1:
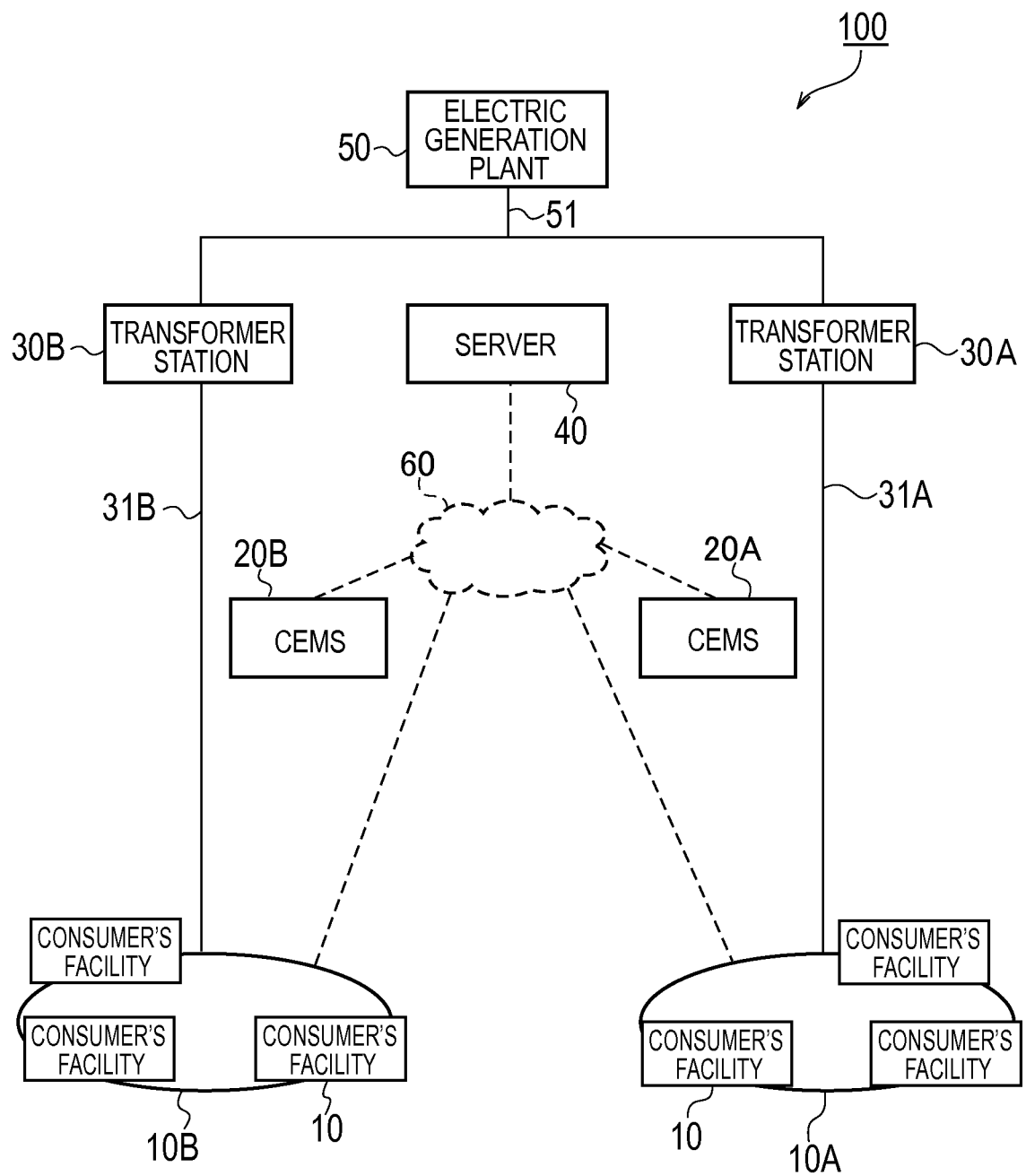
FIG. 1 is a diagram illustrating a control system according to the present embodiment.

Hereinafter, a control system according to an embodiment of the present invention will be described with reference to the accompanying drawings. It is noted that, in the description of the drawings below, like or identical portions are referred to by like or identical reference numerals.

It is noted that it will be appreciated that the drawings are schematically shown and the ratio and the like of each dimension are different from the real ones. Accordingly, specific dimensions, etc. should be determined in consideration of the explanation below. Of course, among the drawings, the dimensional relationship and the ratio may be different.

[Overview of Embodiments]

A consumer's facility equipment according to an embodiment is controlled and/or managed by a control apparatus by exchanging, with the control apparatus, a message configured to comply with a predetermined communication protocol through a network provided in a power consumer's facility. The consumer's facility equipment comprises a controller that determines to execute a process requested by a request message requesting execution of the process on the consumer's facility equipment when the request message is received from the control apparatus and the request message includes predetermined authentication information.

In an embodiment, when a request message includes predetermined authentication information, a consumer's facility equipment includes a controller that determines to execute a process for the designated information. Therefore, it is possible to provide a consumer's facility equipment that enables an enhancement of the security of ECHONET Lite (registered trademark) and the like, a control apparatus therefor, and a control method therefor.

[Embodiment]
(Control System)

Hereinafter, a control system according to the present embodiment will be described. FIG. 1 is a diagram illustrating a control system 100 according to the present embodiment.

As shown in FIG. 1, the control system 100 includes a consumer's facility 10, CEMS 20, a transformer station 30, a server 40, and an electric generation plant 50. It is noted that the consumer's facility 10, the CEMS 20, the transformer station 30, and the server 40 are connected through an external network 60.

The consumer's facility 10 has a power generation apparatus and a power storage apparatus, for example. The power generation apparatus, like a fuel cell, for example, is an apparatus which uses fuel gas to output power. The power storage apparatus, like a secondary battery, for example, is an apparatus in which power is stored.

The consumer's facility 10 may be a detached residence, a shop such as a corner store or a supermarket, a business facility such as an office building, or a factory.

In the present embodiment, a consumer's facility group 10A and a consumer's facility group 10B are configured by a plurality of consumer's facilities 10. The consumer's facility group 10A and the consumer's facility group 10B are classified into each geographical region, for example.

The CEMS 20 controls an interconnection between the plurality of consumer's facilities 10 and a power grid. It is noted that the CEMS 20 manages the plurality of consumer's facilities 10 and thus, may also be called CEMS (Cluster/Community Energy Management System). Specifically, the CEMS 20 disconnects the plurality of consumer's facilities 10 and the power grid during a power failure or the like. On the other hand, the CEMS 20 interconnects the plurality of consumer's facilities 10 to the power grid at power restoration, for example.

In the present embodiment, CEMS 20A and CEMS 20B are provided. The CEMS 20A controls an interconnection between the consumer's facilities 10 included in the consumer's facility group 10A and the power grid, for example. The CEMS 20B controls an interconnection between the consumer's facilities 10 included in the consumer's facility group 10B and the power grid, for example.

The transformer station 30 supplies power to the plurality of consumer's facilities 10 through a distribution line 31. Specifically, the transformer station 30 steps down the voltage supplied from the electric generation plant 50.

In the present embodiment, a transformer station 30A and a transformer station 30B are provided. The transformer station 30A supplies power to the consumer's facilities 10 included in the consumer's facility group 10A through a distribution line 31A, for example. The transformer station 30B supplies power to the consumer's facilities 10 included in the consumer's facility group 10B through a distribution line 31B, for example.

The server 40 manages a plurality of the CEMSs 20 (here, the CEMS 20A and CEMS 20B). Further, the server 40 manages a plurality of the transformer stations 30 (here, the transformer station 30A and the transformer station 30B). In other words, the server 40 integrally manages the consumer's facilities 10 included in the consumer's facility group 10A and the consumer's facility group 10B. For example, the server 40 has a function of balancing the power to be supplied to the consumer's facility group 10A and the power to be supplied to the consumer's facility group 10B.

The electric generation plant 50 generates power by using thermal power, sunlight, wind power, water power, atomic power or the like. The electric generation plant 50 supplies power to the plurality of the transformer stations 30 (here, the transformer station 30A and the transformer station 30B) through an electric feeder line 51.

The external network 60 is connected to each apparatus through a signal line. The external network 60 is Internet, a wide area network, a narrow area network, or a mobile phone network, for example.

(Consumer's Facility)

Figure 2:
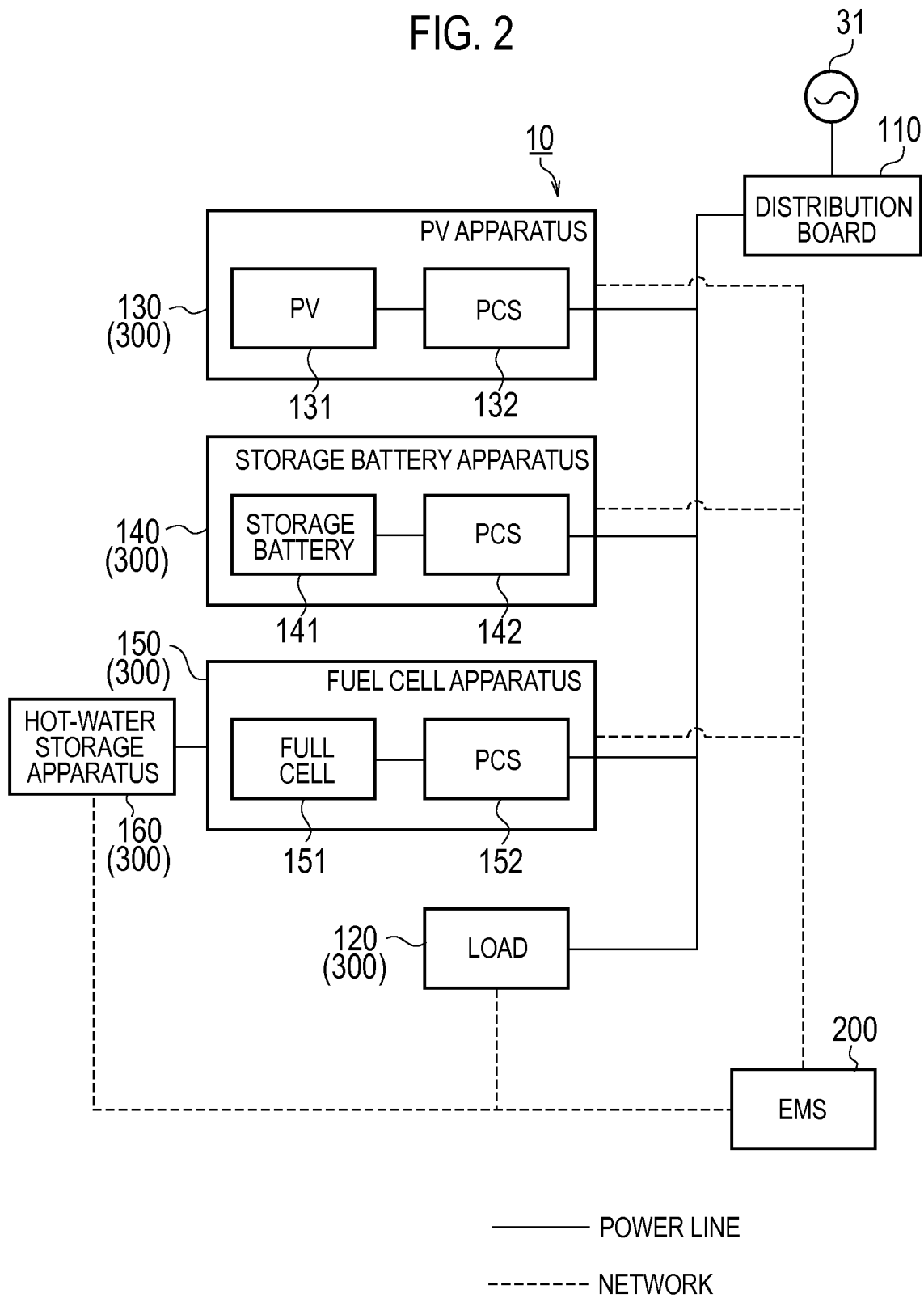
FIG. 2 is a diagram illustrating a detail of a consumer's facility according to the present embodiment.

The consumer's facility 10 according to the present embodiment will be described, below. FIG. 2 is a diagram illustrating a detail of the consumer's facility 10 according to the present embodiment.

As shown in FIG. 2, the consumer's facility 10 has a distribution board 110, a load 120, a PV apparatus 130, a storage battery apparatus 140, a fuel cell apparatus 150, a hot-water storage apparatus 160, and EMS 200. The load 120, the PV apparatus 130, the storage battery apparatus 140, the fuel cell apparatus 150, and the hot-water storage apparatus 160 are an example of an equipment to be provided in the consumer's facility 10 (consumer's facility equipment), and hereinafter generally referred to as "equipment 300", where appropriate.

The distribution board 110 is connected to the distribution line 31 (grid). The distribution board 110 is connected, through a power line, to the load 120, the PV apparatus 130, the storage battery apparatus 140, and the fuel cell apparatus 150. Each equipment may be connected to a power line in any order.

The load 120 is an apparatus that consumes the power supplied through a power line. Examples of the load 120 include a home appliance equipment such as a refrigerator, a freezer, a lighting, and an air conditioner.

The PV apparatus 130 has a PV 131 and a PCS 132. The PV 131 is an example of the power generation apparatus, and is a solar cell which generates power in response to reception of solar light. The PV 131 outputs the generated DC power. An amount of power to be generated by the PV 131 varies depending on an amount of solar radiation entering the PV 131. The PCS 132 is an apparatus (Power Conditioning System) which converts the DC power output from the PV 131, into AC power. The PCS 132 outputs the AC power to the distribution board 110 through a power line.

The storage battery apparatus 140 has a storage battery 141 and a PCS 142. The storage battery 141 is an apparatus in which power is accumulated. The PCS 142 is an apparatus (Power Conditioning System) which converts the AC power supplied from the grid 31, into DC power. Further, the PCS 142 converts the DC power output from the storage battery 141, into AC power.

The fuel cell apparatus 150 has a fuel cell 151 and a PCS 152. The fuel cell 151 is an example of a power generation apparatus, and an apparatus which generates power by using a fuel (gas, for example). The fuel cell 151 may be an SOFC (Solid Oxide Fuel Cell), or may be a PEFC (Polymer Electrolyte Fuel Cell), for example. The PCS 152 is an apparatus (Power Conditioning System) which converts the DC power output from the fuel cell 151, into AC power.

The hot-water storage apparatus 160 is an apparatus which either generates hot water using a fuel or keep a water temperature. Specifically, the hot-water storage apparatus 160 has a hot-water storage tank where the water supplied from the hot-water storage tank is warmed by the heat generated by burning a fuel or the exhaust heat generated by driving (power generated by) the fuel cell 151. In particular, the hot-water storage apparatus 160 warms the water supplied from the hot-water storage tank and feeds the warmed water back to the hot-water storage tank. The fuel cell apparatus 150 and the hot-water storage apparatus 160 configure a hot-water supply apparatus (hot-water supply system).

The EMS 200 is an example of a control apparatus (Energy Management System) that controls and manages the equipment 300. In the present embodiment, the EMS 200 and the equipment 300 are connected through a network provided in the consumer's facility 10. The network is a home area network, for example, and may be wired or radio.

In the present embodiment, the EMS 200 and the equipment 300 exchange messages configured to comply with a predetermined communication protocol. As a result, the EMS 200 controls and manages the equipment 300. Examples of the predetermined communication protocol include ECHONET Lite (registered trademark). The EMS 200 and the equipment 300 that support the ECHONET Lite (registered trademark) corresponds to an ECHONET Lite (registered trademark) node specified in the ECHONET Lite (registered trademark).

The EMS 200 controls an operation mode of the load 120 to control the power consumption in the load 120. Further, the EMS 200 controls an operation mode of the PV apparatus 130, the storage battery apparatus 140, and the fuel cell apparatus 150 to control the power output from the PV apparatus 130, the storage battery apparatus 140, and the fuel cell apparatus 150. Further, the EMS 200 controls an operation mode of the hot-water storage apparatus 160 to control the amount of hot water to be stored in the hot-water storage apparatus 160.

Further, by acquiring a specification and a status of the equipment 300, the EMS 200 manages the equipment 300. The specification of the equipment 300 includes a maker code, a manufacture number, a type, rated power output or rated power consumption, and a type of operation modes, for example. The status of the equipment 300 is a status such as a power supply, a setting temperature, output or power consumption, and an operation mode.

Further, the EMS 200 is connected, through the external network 60, to various types of servers. The EMS 200 acquires, from the various types of servers, information such as a purchase unit price of power supplied from the grid 31, a purchase unit price of the power supplied from the grid 31 or a purchase unit price of fuel gas.

(Configuration of EMS)

Figure 3:
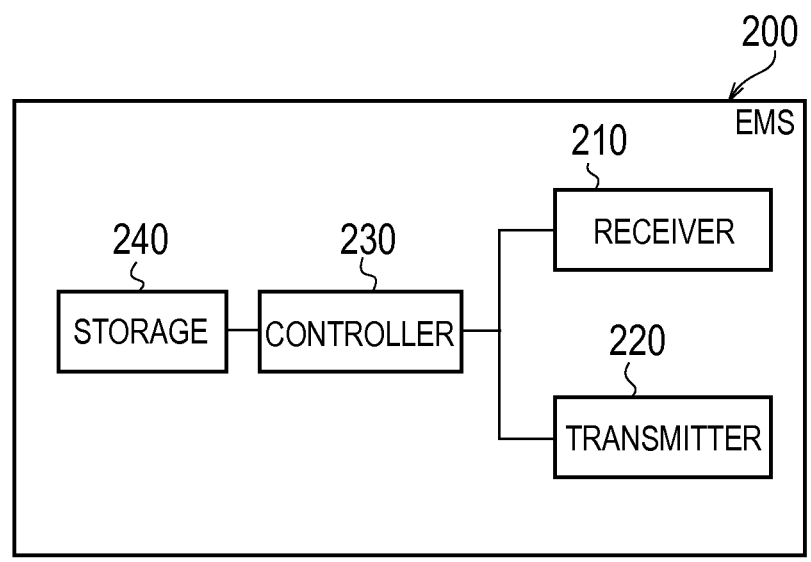
FIG. 3 is a block diagram illustrating EMS according to the present embodiment.

Hereinafter, EMS according to the present embodiment will be described. FIG. 3 is a block diagram illustrating the EMS 200 according to the present embodiment.

As shown in FIG. 3, the EMS 200 has a receiver 210, a transmitter 220, a controller 230, and a storage 240.

The receiver 210 receives a message configured to comply with a predetermined communication protocol from the equipment 300 connected through a network. The receiver 210 passes the received message to the controller 230.

The receiver 210 may receive information necessary for controlling and managing the equipment 300 from the various types of servers through an external network. For example, the receiver 210 may receive, from the various types of servers, through an external network, information such as a power purchase unit price from the grid 31, a power selling unit price to the grid 31, an estimated power consumption in the consumer's facility 10, and an estimated output power The transmitter 220 transmits a message created by the controller 230, to the equipment 300 connected through a network.

The controller 230 controls the receiver 210, the transmitter 220, and the storage 240.

Further, the controller 230 creates a message configured to comply with a predetermined communication protocol. For example, when it is requested to execute a predetermined process on information designated from among the information provided in the equipment 300 (hereinafter, "designated information"), the controller 230 creates a request message configured to comply with a predetermined communication protocol. Further, when the equipment 300 is notified of the information included in the EMS 200 in response to the request from the equipment 300 or voluntarily, the controller 230 creates a notification message configured to comply with a predetermined communication protocol.

It should be noted here that the information included in the equipment 300 is information to be controlled and managed by the EMS 200 (controller 230). It should be further noted that from among the information included in the equipment 300, not only information (such as a maker code, a manufacture number, and a type) previously defined by a predetermined communication protocol, but also information (such as code indicating an operation mode of the equipment 300) uniquely defined by a user are to be controlled and managed by the EMS 200.

The storage 240 stores information necessary for controlling and managing the equipment 300. For example, the storage 240 stores the specification and the status of the equipment 300 acquired from the equipment 300. Further, in the present embodiment, the storage 240 stores second authentication information used for authenticating the EMS 200. The second authentication information will be described later.

(Configuration of Equipment)

Figure 4:
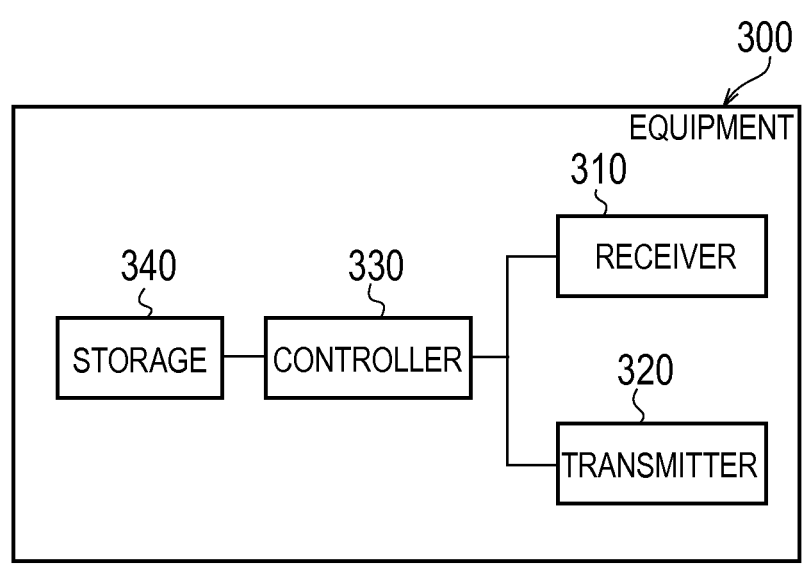
FIG. 4 is a block diagram illustrating a consumer's facility equipment according to the present embodiment.

The consumer's facility equipment according to the present embodiment will be described, below. FIG. 4 is a block diagram illustrating the equipment 300 according to the present embodiment.

As shown in FIG. 4, the equipment 300 has a receiver 310, a transmitter 320, a controller 330, and a storage 340.

The receiver 310 receives a message configured to comply with a predetermined communication protocol from the EMS 200 connected through a network. The receiver 310 passes the received message to the controller 330.

The transmitter 320 transmits a message created by the controller 330, to the EMS 200 through a network.

The controller 330 controls the receiver 310, the transmitter 320, and the storage 340.

Further, in the present embodiment, the controller 330 creates a message configured to comply with a predetermined communication protocol. Specifically, when receiving a request message from the EMS 200, the controller 330 creates a response message corresponding to the request message. Alternatively, during a start-up of the equipment or an initial connection to a network, the controller 330 creates a notification message for notifying another node connected to a network of a specification (such as a maker code, an equipment number, and a manufacture number) of the equipment.

The storage 340 stores information included in the equipment 300. For example, the storage 340 stores the specification and the status of the equipment 300.

In the present embodiment, the storage 340 stores first authentication information used for authenticating the EMS 200. The first authentication information will be described later.

(Configuration of Message)

Figure 5:
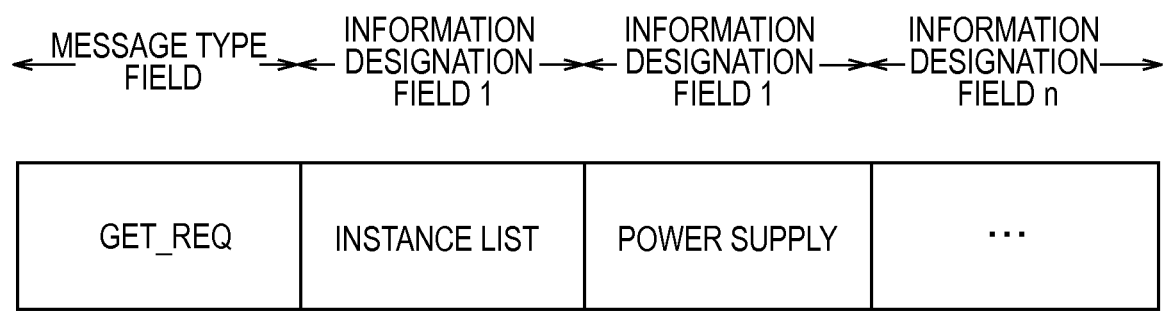
FIG. 5 is a diagram illustrating a configuration of a message according to the present embodiment.
Figure 6:
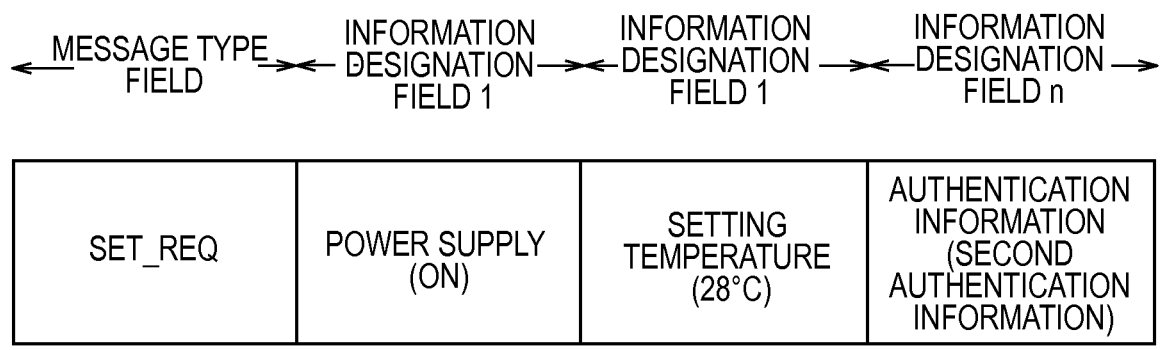
FIG. 6 is a diagram illustrating a configuration of a message according to the present embodiment.

The configuration of a message according to the present embodiment will be described, below. FIG. 5 and FIG. 6 are a diagram illustrating the configuration of a message according to the present embodiment.

As described above, the controller 230 of the EMS 200 creates a request message configured to comply with a predetermined communication protocol. The request message has a message type field and a plurality of information designation fields corresponding to the message type field.

The message type field indicates the type of a message. For example, a message having a value indicating a readout request (Get_Req) to be designated in the message type field is a reference request message that requests a readout of the designated information (see FIG. 5). Further, a message having a value indicating a write request (Set_Req) to be designated in the message type field is a control request message that requests a write into the designated information (see FIG. 6).

The plurality of information designation fields indicate one or more pieces of information designated from among plural pieces of information included in the equipment 300. Specifically, the EMS 200 designates the information that is requested to be executed to read out or write, from among the plural pieces of information included in the equipment 300, and indicates the designated information in the information designation field.

The reference request message is classified into a specification reference request message or a status reference request message depending upon whether the designated information is a specification or a status. The control request message is a message that requests execution of a write for the status, and corresponds to a status control request message.

For example, in a message shown in FIG. 5, in the message type field, a value indicating the readout request (Get_Req) is designated, and in an information designation field 1, an instance list is designated. The instance list is a list in which a type of the equipment 300 is indicated in accordance with a class specified in a predetermined communication protocol. Therefore, this message corresponds to a reference request message of the instance list (specification reference request message). Further, in a message shown in FIG. 5, a power supply is further designated in an information designation field 2. Therefore, this message also corresponds to a reference request message of a status of a power supply (status reference request message).

Further, in a message shown in FIG. 6, in the message type field, a value indicating the write request (Set_Req) is designated, and in the information designation field 1, a power supply (status: on) is designated. Therefore, this message corresponds to a control request message (status control request message) for turning on the status of the power supply.

In the present embodiment, the controller 230 of the EMS 200 may create one request message in which the reference request message and the control request message are combined. In such a case, the request message has a field for two message types (Get_Req and Set_Req) and an information designation field corresponding to each message type field.

In the present embodiment, the controller 230 of the EMS 200 may include the second authentication information used for authenticating the EMS 200, into the request message. Specifically, the controller 230 creates a control request message that includes the second authentication information in the information designation field, for example.

Further, the controller 230 may encrypt the second authentication information by using a hash function, etc., and include the encrypted second authentication information into the request message.

In the present embodiment, when the request message includes the second authentication information corresponding to the first authentication information, the controller 330 of the equipment 300 determines to execute a process for the designated information. Specifically, the controller 330 confirms whether or not the request message includes the second authentication information. As described above, the first authentication information and the second authentication information are information used for authenticating the EMS 200, the first authentication information is stored in the storage 340 of the equipment 300, and the second authentication information is stored in the storage 240 of the EMS 200. The controller 330 executes the authentication of the EMS 200 by a common key system, for example. Specifically, when the second authentication information included in the request message matches the first authentication information stored in the storage 340, it is confirmed that the EMS 200 is a trustworthy node.

In the present embodiment, when it is determined to execute a process for the designated information, the controller 330 creates a response message responding to the request message. Specifically, in response to the reference request message, the controller 330 creates a response message including the read-out information. Alternatively, in response to the control request message, the controller 330 creates a response message indicating that a write into the designated information was executed.

On the other hand, when the request message does not include the second authentication information, the controller 330 determines to not execute a process for the designated information. Specifically, when the request message does not include the second authentication information, or when the authentication information included in the request message does not match the first authentication information, the controller 330 determines to not execute a process for the designated information and creates a response message indicating to that effect.

(Control Method)

Figure 7:
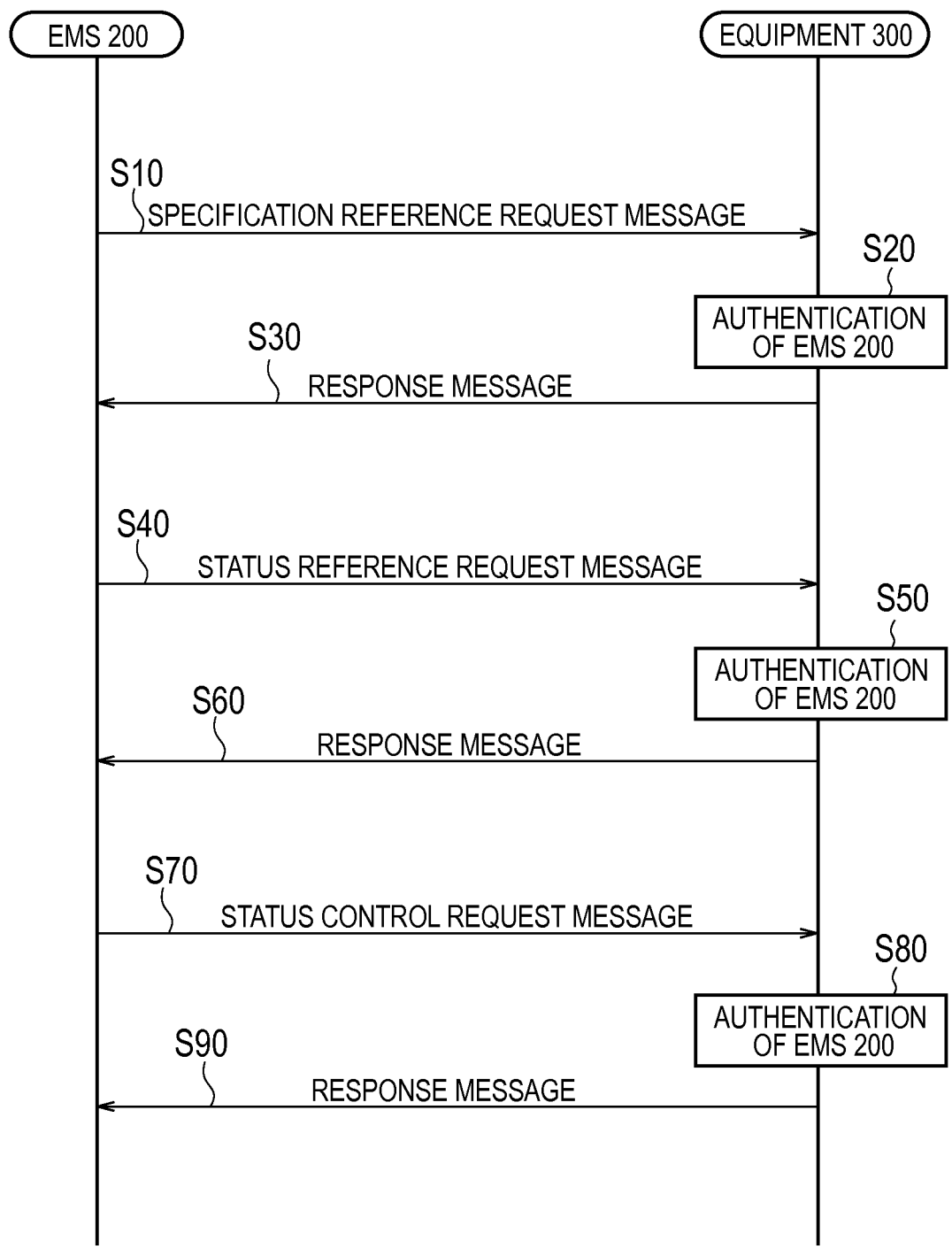
FIG. 7 is a sequence diagram illustrating a control method according to the present embodiment.

A control method according to the present embodiment will be described, below. FIG. 7 is a sequence diagram illustrating the control method according to the present embodiment.

As shown in FIG. 7, in step S10, the EMS 200 transmits the specification reference request message to the equipment 300. Description proceeds with understanding that the specification reference request message is a message requesting a readout of the instance list, below.

In step S20, the equipment 300 executes the authentication of the EMS 200. Specifically, the equipment 300 confirms whether or not the specification reference request message includes the second authentication information corresponding to the first authentication information. When the specification reference request message includes the second authentication information corresponding to the first authentication information, the equipment 300 determines to execute a readout of the instance list. On the other hand, when the specification reference request message does not include the second authentication information or when the authentication information included in the specification reference request message does not correspond to the first authentication information, the equipment 300 determines to not execute a readout of the instance list.

In step S30, the equipment 300 transmits the response message corresponding to the specification reference request message, to the EMS 200. For example, in step S20, when it is determined to execute a readout of the instance list, the equipment 300 transmits the response message including the read-out instance list, to the EMS 200. Further, in step S20, when it is determined to not execute a readout of the instance list, the equipment 300 transmits to the EMS 200 a response message indicating to that effect.

In step S40, the EMS 200 transmits the status reference request message to the equipment 300. Description proceeds with understanding that the status reference request message is a message requesting a readout of the status of the power supply, below.

In step S50, the equipment 300 executes the authentication of the EMS 200. Specifically, the equipment 300 confirms whether or not the status reference request message includes the second authentication information corresponding to the first authentication information. When the status reference request message includes the second authentication information corresponding to the first authentication information, the equipment 300 determines to execute a readout of the status of the power supply. On the other hand, when the status reference request message does not include the second authentication information or when the authentication information included in the status reference request message does not correspond to the first authentication information, the equipment 300 determines to not execute a readout of the status of the power supply.

In step S60, the equipment 300 transmits the response message corresponding to the status reference request message, to the EMS 200. For example, in step S50, when it is determined to execute a readout of the status of the power supply, the equipment 300 transmits the response message including the read-out status of the power supply (for example, power supply on), to the EMS 200. Further, in step S50, when it is determined to not execute a readout of the status of the power supply, the equipment 300 transmits, to the EMS 200, a response message indicating to that effect.

In step S70, the EMS 200 transmits the status control request message to the equipment 300. Description proceeds with understanding that the status control request message is a message requesting a write for the status of the power supply, in particular, a control request message instructing to turn off the power supply in this example.

In step S80, the equipment 300 executes the authentication of the EMS 200. Specifically, the equipment 300 confirms whether or not the status control request message includes the second authentication information corresponding to the first authentication information. When the status control request message includes the second authentication information corresponding to the first authentication information, the equipment 300 determines to execute a write for the status of the power supply. Specifically, the equipment 300 turns off the power supply of the equipment 300 and changes the status of the power supply to power supply off. On the other hand, when the status control request message does not include the second authentication information or when the authentication information included in the status control request message does not correspond to the first authentication information, the equipment 300 determines to not switch a power supply state and further to not execute a write for the status of the power supply.

In step S90, the equipment 300 transmits the response message corresponding to the status control request message, to the EMS 200. For example, in step S80, when it is determined to execute a write for the status of the power supply, the equipment 300 transmits the response message including the status of the power supply for the write (for example, power supply off), to the EMS 200. Alternatively, in step S80, when it is determined to not execute a write for the status of the power supply, the equipment 300 transmits, to the EMS 200, a response message indicating to that effect.

As described above, in the present embodiment, the equipment 300 allows a response to the request message to change in response to the presence or absence of the second authentication information. That is, the equipment 300 determines whether or not to be controlled and managed by the EMS 200 in accordance with the reliability of the EMS 200. Therefore, it is possible to provide a consumer's facility equipment with which it is possible to enhance the security such as ECHONET Lite (registered trademark), a control apparatus therefor, and a control method therefor.

[First Modification]

A control system according to a first modification of the present embodiment will be described below with a focus on a difference from the control system according to the present embodiment. FIG. 8 is a diagram illustrating a table to be stored in the storage 340 of the equipment 300 according to the first modification.

In the first modification, the storage 340 stores plural pieces of first authentication information to which authentication levels are set. When the request message includes the second authentication information, the controller 330 determines to execute a process for information selected from the designated information in accordance with an authentication level set to the first authentication information corresponding to the second authentication information.

Further, in the first modification, when the request message includes the second authentication information and requests a readout and a write for the designated information, if the authentication level corresponding to the second authentication information is lower than a predetermined authentication level, then the controller 330 determines to execute a readout of the designated information and determines to not execute a write into the designated information.

Here, it should be noted that the following description is description when the request message includes the second authentication information. When the request message does not include the second authentication information, the controller 330 determines to not execute a process for the designated information in much the same way as in the present embodiment.

In the first modification, as shown in FIG. 8, the storage 340 stores a table formulating a corresponding process for each authentication level when receiving the specification reference request message, the status reference request message, or the status control request message.

Firstly, in a case of a "high" authentication level, it is formulated that it is possible to process any case where the specification reference request message, the status reference request message, and the status control request message are received. Therefore, when the second authentication information included in the request message corresponds to the first authentication information having a "high" authentication level, the controller 330 determines to execute all the designated processes.

Secondly, in a case of a "medium" authentication level, it is formulated that it is possible to process a case where the specification reference request message and the status reference request message are received; however, it is formulated that it is possible to partially process a case where the status control request message is received. Therefore, when the second authentication information included in the status control request message corresponds to the first authentication information having a "medium" authentication level, the controller 330 determines to not execute a write for the information having a high significance (for example, the power supply) from among the designated information, and determines to execute a write only for information having a low significance (for example, a setting temperature) from among the designated information.

Thirdly, in a case of a "low" authentication level, it is formulated that it is possible to partially process a case where the specification reference request message and the status reference request message are received; however, it is formulated that it is not possible to process a case where the status control request message is received. Therefore, when the second authentication information included in the specification reference request message or the status reference request message corresponds to the first authentication information having a "low" authentication level, the controller 330 determines to not execute a readout for the information having a high significance (for example, an operation mode) from among the designated information, and determines to execute a readout only for the information having a low significance (for example, a maker code, a manufacture number, and a type) from among the designated information. Further, when the second authentication information included in the status control request message corresponds to the first authentication information having a "low" authentication level, the controller 330 determines to not execute a write of the designated information.

As described above, in the first modification, the equipment 300 executes only a process selected from the designated information, in accordance with the authentication level corresponding to the second authentication information, the type of a requested process, and the significance of the designated information. That is, the equipment 300 determines an acceptance level by which the equipment 300 is controlled and managed by the EMS 200 in accordance with the reliability of the EMS 200. Therefore, it is possible to provide an equipment with which it is possible to enhance the security such as ECHONET Lite (registered trademark), a control apparatus therefor, and a control method therefor.

[Second Modification]

Figure 9:
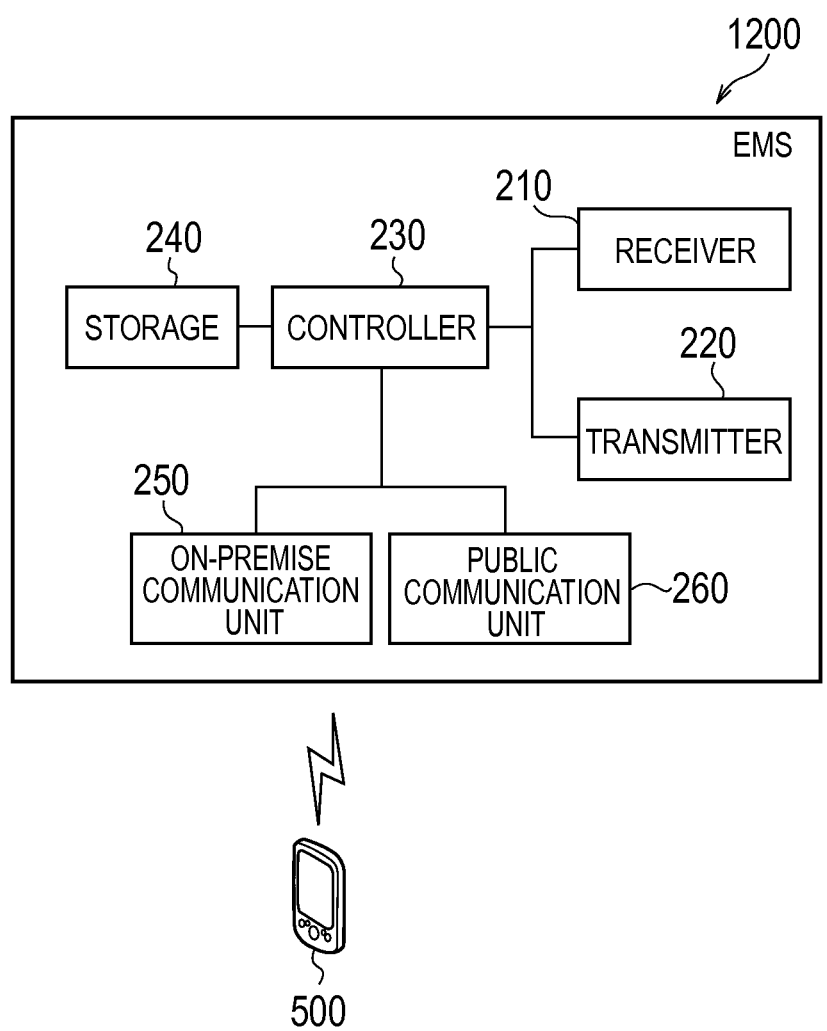
FIG. 9 is a block diagram illustrating EMS according to a second modification.
Figure 10:
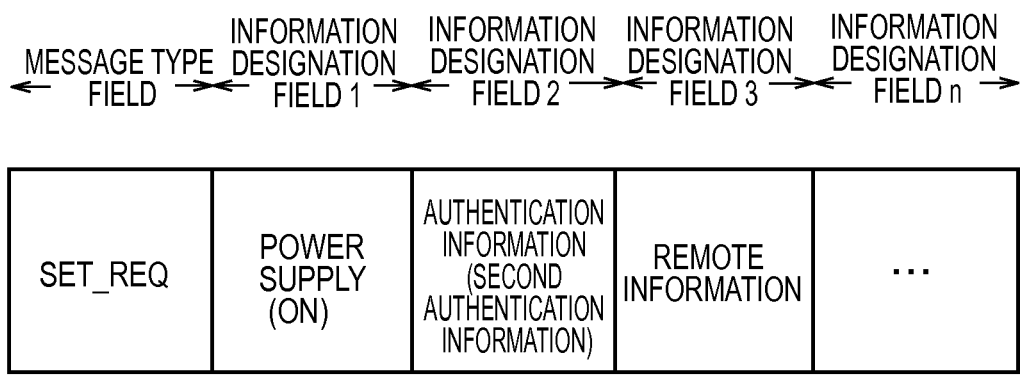
FIG. 10 is a diagram illustrating a configuration of a message according to the second modification.

In the first modification, an example is described in which when the request message from the EMS 200 is received by the equipment 300, the authentication level for the second authentication information is confirmed; in a second modification, an example will be described in which remote information indicating whether or not the process instruction is a process instruction by a remote control is further included in the information designation field of the request message. FIG. 9 is a block diagram illustrating EMS according to the second modification. FIG. 10 is a diagram illustrating a configuration of a message according to the second modification.

As shown in FIG. 9, EMS 1200 further includes an on-premise communication unit 250 that corresponds to near field communication such as WiFi, and a public communication unit 260 that corresponds to a public communication scheme such as Ethernet (registered trademark), in addition to the receiver 210 and the transmitter 220 shown in FIG. 3.

In the second modification, the EMS 1200 is capable of performing direct communication with a mobile terminal 500 (for example, a smart phone or a tablet PC) within an area of near field communication by using the on-premise communication unit 250.

Further, in the second modification, the EMS 1200 is connected through the public communication unit 260 to the external network 60 or connected through a router installed in the on-premise communication unit 250 and the consumer's facility 10 to the external network 60 to thereby communicate with the server 40. The server 40 is capable of communicating with the mobile terminal 500 by way of the external network 60. That is, the EMS 1200 is capable of performing indirect communication, through the external network 60, with the mobile terminal 500.

Therefore, the EMS 1200 is capable of communicating with the mobile terminal 500 through either one of the two grids, that is, a grid for direct communication using the on-premise communication unit 250 or a grid for indirect communication by way of the public communication unit 260 or the server 400 through a router. That is, the mobile terminal 500 is connected to the EMS 1200 by communication having the two grids.

In the second modification, the mobile terminal 500 presents, to a user, an input screen for inputting a process instruction for the equipment 300. When the user inputs the process instruction in accordance with the input screen, the mobile terminal 500 transmits the process instruction to the EMS 1200 by using either one of the communication grids having two grids, and in this way, the request message corresponding to a content of the process instruction is transmitted from the EMS 1200 to the equipment 300.

Here, when the request message is transmitted to the equipment 300, if the process instruction that acts as a trigger for transmitting the request message is transmitted from the mobile terminal 500, then the EMS 1200 determines whether the process instruction is a process instruction by the direct communication using the on-premise communication unit 250 or the process instruction is a process instruction by the indirect communication through the external network 60, that is, a remote control.

Firstly, in a case of the direct communication using the on-premise communication unit 250, the EMS 1200 is capable of previously grasping an IP address of a transmission source (mobile terminal 500) of the process instruction because the EMS 1200 and the mobile terminal 500 are in the same local area (within the service area of the near field communication). Thus, if the process instruction is transmitted from the IP address known by the EMS 1200, then the EMS 1200 is capable of immediately determining that the process instruction is a process instruction by the direct communication.

On the other hand, in a case of the indirect communication through the external network 60, the EMS 1200 receives the process instruction by either a Push type or a Pull type, for example. The Push type is a type in which the server 40 transmits the process instruction when the server 40 on the external network 60 receives the process instruction from the mobile terminal 500. The Pull type is a type in which the process instruction transmitted from the mobile terminal 500 is accumulated as a queue in the server 40, the EMS 1200 regularly accesses the server 40, and the EMS 1200 acquires an unprocessed queue if any. In the former, when the transmission-source IP address of the process instruction is an IP address of the server 40, the EMS 1200 is capable of immediately determining that the process instruction is a process instruction by the indirect communication. Further, in the latter, the EMS 1200 voluntarily assesses the server 40 to acquire the process instruction, and thus, needless to say, the EMS 1200 is capable of determining that the process instruction is a process instruction by the indirect communication.

With the techniques described above, the EMS 1200 determines whether the received process instruction is by the indirect communication or the direct communication. As shown in FIG. 10, when receiving the process instruction by the indirect communication, that is, the remote control, the EMS 1200 includes the remote information indicating that the process instruction is a process instruction by the remote control, into the information designation field of the request message. On the other hand, when the received process instruction is the process instruction by the direct communication, the EMS 1200 does not include the remote information into the information designation field.

On the other hand, when the equipment 300 receives the request message sent from the EMS 1200 as in steps S10, S40, and S70 in FIG. 7, the equipment 300 authenticates the EMS 1200 by the second authentication information and determines whether or not the remote information is included in the information designation field of the request message. The equipment 300 performs a process instructed by the request message when authentication of the EMS 1200 is possible and the remote information is not included in the request message. However, when the remote information is included in the request message, the equipment 300 not only performs the process instructed by the request message but also notifies that the process instruction is a process instruction by the remote control. Specifically, when the equipment 300 includes an indicator configured by a device such as a light-emitting diode and the remote information is not included in the request message, the equipment 300 allows the indicator to emit light in blue. On the other hand, when the remote information is included in the request message, the equipment 300 allows the indicator to brink light in red, for example. Thus, when the remote information is included in the request message, the equipment 300 makes a notification in a different manner so as to express that the process instruction is a process instruction by the remote control.

Depending on the types of the equipment 300, there is a case where the equipment 300 itself has an input screen for inputting a process instruction for the equipment 300 or an operation unit such as an operation button, or the equipment 300 additionally has a remote operation by infrared communication or a wired remote controller. When a process is instructed by the operation unit of the equipment 300 or an operation of a remote controller thereof, it is obvious that this operation is done on the premises (that is, within the same local area). Therefore, in such a case, the equipment 300 may make a notification in much the same way as in a case where the remote information is not included in the request message received from the EMS 1200. Alternatively, in such a case, the equipment 300 may make a notification in a third notification manner different from the case where the remote information is included or not included in the request message.

Thus, depending on each case, that is, where a power supply of a home appliance such as a television is turned on by an operation of the mobile terminal 500, etc., where a user instructs, on the premises, a process through near field communication, and where a remote control is applied through the external network 60 from outside the premises, for example, the home appliance makes a notification in a different manner. That is, when a home appliance is operated, a person staying on the premises confirms the notification manner to thereby distinguish an operation by an operation from within the premises from an operation by the remote control.

Further, the equipment 300 may be configured so that the authentication level described in the first modification is applied, in accordance with whether the remote information is included in the request message. For example, when the remote information is included in the reference request message, in much the same way as in receiving the request message including the second authentication information having a "low" authentication level in the first modification, the equipment 300 determines to not execute a readout on the information having a high significance (for example, an operation mode), and determines to execute a readout only on the information having a low significance (for example a maker code, a manufacture number, and a type). As a result, when the process instruction is a process instruction by the remote control, the information having a high significance is not transmitted to the mobile terminal 500. In other words, although it is possible to perform an operation on the information having a low significance from the mobile terminal 500, etc., irrespective of whether outside or on the premises, it is possible to ensure that the information having a high significance is not operated by the remote control. That is, it is possible to perform on the premises the operation similar to the operation by the operation unit of the equipment 300 or by the remote controller (because this is an operation on the premises, there is no special operation restriction), also by using the mobile terminal 500, etc.

[Other Embodiments]

The present invention is explained through the above-described embodiments, but it must not be understood that this invention is limited by the statements and the drawings constituting a part of this disclosure. From this disclosure, various alternative embodiments, examples, and operational technologies will become apparent to those skilled in the art.

In the embodiment, as a predetermined communication protocol, ECHONET Lite (registered trademark) is used as an example. However, the embodiment is not limited to this protocol; as the predetermined communication protocol, a communication protocol (for example, ZigBee (registered trademark) or KNX) other than the ECHONET Lite (registered trademark) may be used. Alternatively, as the predetermined communication protocol, ECHONET Lite (registered trademark) and another communication protocol may be combined and used.

It should be noted that although not particularly mentioned in the embodiment, a message configured to comply with a predetermined communication protocol further has, besides the message type field and the information designation field, a field indicating identification information of a transmission source node and a transmission target node or a reference number of a message.

The EMS 200 may be HEMS (Home Energy Management System), may be SEMS (Store Energy Management System), may be BEMS (Building Energy Management System), and may be FEMS (Factory Energy Management System).

In the embodiment, description is provided when the consumer's facility 10 has the load 120, the PV apparatus 130, the storage battery apparatus 140, the fuel cell apparatus 150, and the hot-water storage apparatus 160. However, it may suffice that the consumer's facility 10 has at least the load 120. Alternatively, when the fuel cell apparatus 150 and the hot-water storage apparatus 160 configure the hot-water supply apparatus, the fuel cell apparatus 150, in place of the hot-water storage apparatus 160, may exchange a message regarding the hot-water storage apparatus 160 with the EMS 200.

Thus, it goes without saying that the present invention includes various embodiments and the like not described here. Moreover, it is also possible to combine the above-described embodiments and modifications. Therefore, the technical range of the present invention is to be defined only by the inventive specific matter according to the adequate claims from the above description.

It is noted that the entire contents of Japanese Patent Application No. 2013-059502 (filed on Mar. 22, 2013) is incorporated herein by reference.

INDUSTRIAL APPLICABILITY

According to the present invention, it is possible to provide a consumer's facility equipment, a control apparatus, and a control method that enable an enhancement of the security of ECHONET Lite (registered trademark) and the like.

The invention claimed is:

1. An equipment connected to a local area network that complies with a predetermined communication protocol, the equipment comprising:
   a receiver configured to receive a process instruction message, indicating a process instruction for the equipment, through the local area network from a control apparatus communicable with the local area network and a public network other than the local area network, wherein the local area network is a network for a consumer's facility, wherein the equipment is not directly connected to the public network, and wherein the process instruction message comprises an information element that indicates whether or not the process instruction for the equipment is made through the public network, and
   a controller configured to execute
      a determining process of determining whether or not the process instruction for the equipment is made through the public network, based on the information element included in the process instruction message received through the local area network,
      a first process according to the process instruction message, received through the local area network, when the determining process determines that the process instruction is made through the public network, and
      execute a second process, different from the first process, according to the process instruction message, received by the receiver, when the determining process determines that the process instruction is not made through the public network.

2. The equipment according to claim 1, wherein a range operable by the first process is restricted compared to a range operable by the second process.

3. The equipment according to claim 1, wherein the predetermined communication protocol is ECHONET Lite (registered trademark).

4. The equipment according to claim 1, wherein the process instruction message further comprises an information element requesting an execution of a process of the equipment.

5. The equipment according to claim 1, wherein the controller is configured to determine that the process instruction is made outside of the consumer's facility, having the equipment, when the process instruction is made through the public network.

6. The equipment according to claim 1, wherein the controller is configured to change an authentication level of a message received from the control apparatus in accordance with whether or not the process instruction is made through the public network.

7. The equipment according to claim 1, comprising a transmitter configured to transmit a message to the control apparatus, wherein the message includes an information element including at least one of a maker code, a manufacturing number, and a type of the equipment.

8. The equipment according to claim 1, wherein the information element is different from address information of a terminal transmitting the process instruction.

9. A control apparatus communicable with a local area network that complies with a predetermined communication protocol and a public network other than the local area network, wherein the local area network is a network for a consumer's facility, the control apparatus comprising:
  a transmitter configured to transmit a process instruction message, indicating a process instruction for equipment, through the local area network to the equipment connected to the local area network, wherein the equipment is not directly connected to the public network, and wherein the process instruction message comprises an information element that indicates whether or not the process instruction for the equipment is made through the public network,
  wherein the information element is used by the equipment to execute
    a determining process of determining whether or not the process instruction for the equipment is made through the public network, based on the information element included in the process instruction message received through the local area network,
    a first process according to the process instruction message, received through the local area network, when the determining process determines that the process instruction message is made through the public network, and
    a second process, different from the first process, according to the process instruction message, transmitted by the transmitter, when the determining process determines that the process instruction is not made through the public network.

10. A control method used in a control system including an equipment connected to a local area network that complies with a predetermined communication protocol and a control apparatus communicable with the local area network and a public network other than the local area network, wherein the local area network is a network for a consumer's facility, and wherein the equipment is not directly connected to the public network, the control method comprising:
  transmitting, from the control apparatus to the equipment through the local network, a process instruction message, indicating a process instruction for the equipment, wherein the process instruction message comprises an information element that indicates whether or not the process instruction for the equipment is made through the public network;
  determining, by the equipment, whether or not the process instruction for the equipment is made through the public network, based on the information element included in the process instruction message received through the local area network;
  executing, by the equipment, a first process according to the process instruction message received through the local area network, when determining that the process instruction is made through the public network; and
  executing, by the equipment, a second process, different from the first process, according to the process instruction message, transmitted by the control apparatus, when determining that the process instruction is not made through the public network.

* * * * *